(12) United States Patent
Hamada et al.

(10) Patent No.: US 7,636,942 B2
(45) Date of Patent: Dec. 22, 2009

(54) METHOD AND SYSTEM FOR DETECTING DENIAL-OF-SERVICE ATTACK

(75) Inventors: Masaki Hamada, Tokyo (JP); Hitoshi Fuji, Tokyo (JP); Makoto Iwamura, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 437 days.

(21) Appl. No.: 10/578,868

(22) PCT Filed: Aug. 19, 2005

(86) PCT No.: PCT/JP2005/015156

§ 371 (c)(1),
(2), (4) Date: May 11, 2006

(87) PCT Pub. No.: WO2006/046345

PCT Pub. Date: May 4, 2006

(65) Prior Publication Data

US 2007/0067839 A1 Mar. 22, 2007

(30) Foreign Application Priority Data

Oct. 28, 2004 (JP) .............................. 2004-313284

(51) Int. Cl.
*G06F 11/00* (2006.01)
*H04L 9/00* (2006.01)

(52) U.S. Cl. .............................. 726/22; 726/23; 726/24; 726/25; 726/26; 726/27; 713/168; 713/169; 713/170; 713/171; 713/172

(58) Field of Classification Search ............ 726/22
See application file for complete search history.

(56) References Cited

U.S. PATENT DOCUMENTS

| | | | | |
|---|---|---|---|---|
| 7,007,299 | B2 * | 2/2006 | Ioele et al. .................. | 726/14 |
| 7,310,684 | B2 * | 12/2007 | Patrick et al. ............... | 709/238 |
| 2004/0064738 | A1 * | 4/2004 | Kanno et al. ................ | 713/201 |
| 2007/0006314 | A1 * | 1/2007 | Costa et al. .................. | 726/25 |

FOREIGN PATENT DOCUMENTS

JP 2003-283555 10/2003

(Continued)

OTHER PUBLICATIONS

U.S. Appl. No. 10/579,891, filed May 19, 2006, Hamada.

(Continued)

*Primary Examiner*—Longbit Chai
(74) *Attorney, Agent, or Firm*—Oblon, Spivak, McClelland, Maier & Neustadt, L.L.P.

(57) ABSTRACT

A monitoring device monitors a packet transmitted to a communication device that is a target of the denial-of-service attack, and detects traffic abnormality information indicating an abnormality of traffic due to the packet with respect to the communication device. A performance measuring device measures performance of the communication device, and detects performance abnormality information indicating an abnormality of throughput of the communication device. An attack determining device determines whether the communication device received the denial-of-service attack, based on the traffic abnormality information and the performance abnormality information.

14 Claims, 7 Drawing Sheets

FOREIGN PATENT DOCUMENTS

| | | |
|---|---|---|
| JP | 2004-30287 | 1/2004 |
| JP | 2004-164553 | 6/2004 |
| JP | 2004-280724 | 10/2004 |
| KR | 10-2004-0036228 | 4/2004 |

OTHER PUBLICATIONS

Yohsuke Takei, et al. "A Intrusion Detection and Trace using the Traffic Pattern"; Technical Report of the Institute of Electronics, Information and Communication Engineers, IN99-75; Nov. 18, 1999; vol. 99; No. 436; 8 pgs.

Kenji Noda, et al. "A Proposal of Correlation Analysis for Distributed Intrusion Detection Systems"; Proceedings of Computer Security Symposium 2002; Information Processing Society of Japan; Oct. 30, 2002; vol. 2002; No. 16; pp. 6 pgs.

* cited by examiner

FIG.3

|   | DETECTION ATTRIBUTE | DETECTION THRESHOLD | DETECTION TIME |
|---|---|---|---|
| 1 | {Dst=192.168.1.1/32, Protocol=TCP, Port=80} | 300 kbps | 10 SEC |
| 2 | {Dst=192.168.1.2/32} | 100 kbps | 10 SEC |

| | PERFORMANCE ATTRIBUTE | DETECTION THRESHOLD | TIMES OF DETECTION |
|---|---|---|---|
| 1 | {Dst=http://www.abc.com} {res="hello"} | 5 SEC | 2/3 |
| 2 | {Dst=http://www.def.com/serch?hl=ja&ie=UTF-8&q=x+Y&lr=} {res="SEARCH RESULT"} | 5 SEC | 1/1 |

METHOD AND SYSTEM FOR DETECTING DENIAL-OF-SERVICE ATTACK

TECHNICAL FIELD

The present invention relates to a method and a system for detecting a denial-of-service attack on a communication device using a monitoring device for monitoring a packet transmitted to the communication device that is a target of a denial-of-service attack, a performance measuring device for measuring performance of the communication device, and an attack determining device for performing communication with the monitoring device and the performance measuring device. More particularly, the present invention relates to a denial-of-service attack detecting system and a denial-of-service attack detecting method capable of detecting only a denial-of-service attack which needs to be dealt with by improving the precision of detection of denial-of-service attacks.

BACKGROUND ART

There have been known attacks through networks such as denial-of-service attacks (including distributed denial-of-service attacks) paralyzing networks and server machines (hereinafter, "communication device") by sending great amounts of packets thereto. Because the denial-of-service attacks are difficult to be detected by a method focusing on feature amounts of packets, a system for detecting denial-of-service attacks by a method focusing on an abnormality of traffic (volume) is widely used.

In the system for detecting denial-of-service attacks, steady traffic, obtained by measuring traffic to a communication device that is a target of an attack over a predetermined period of time, is previously calculated by manually or automatically. If the traffic monitored deviates from the steady traffic, this is regarded as an attack, and the denial-of-service attack is detected in this manner (see, for example, Patent document 1).

Patent document 1: Japanese Patent Application Laid-Open No. 2003-283555.

DISCLOSURE OF INVENTION

Problem to be Solved by the Invention

However, there are many cases where the denial-of-service attack does not do any real damage to services provided by a communication device even if an abnormality seems to occur in traffic, because of a relationship between the scale of an attack and each throughput of a network and the communication device. In these cases, even if the denial-of-service attack detecting system detects the abnormality as an attack, there is no need to specifically deal with the abnormality. Thus, it looks as if there is no difference between this case and incorrect detection.

If the main purpose of the denial-of-service attack detecting system is considered to protect communication devices from denial-of-service attacks, it is more important to quickly find out an abnormality of traffic which causes degradation of performance, than to improve the precision of determination on whether an abnormality of traffic is an attack. However, in the conventional denial-of-service attack detecting system, an attack is detected based on only a traffic abnormality without allowing for the throughput or the like of a communication device. Therefore, detection of a traffic abnormality which has nothing to do with degradation of performance, that is, detection of cases which do not need to be dealt with (incorrect detection in the broad sense) increases.

The present invention has been achieved to solve the problems due to conventional technology, and it is an object of the present invention is to provide a denial-of-service attack detecting system and a denial-of-service attack detecting method capable of detecting only a denial-of-service attack which needs to be dealt with by improving the precision of detection of denial-of-service attacks.

Means for Solving Problem

To solve the above problems and to achieve the goal, a denial-of-service attack detecting system for detecting a denial-of-service attack on a communication device, according to one aspect of the present invention includes a monitoring device that monitors a packet transmitted to a communication device that is a target of the denial-of-service attack; a performance measuring device that measures performance of the communication device; and an attack determining device that performs communication with the monitoring device and the performance measuring device. The monitoring device includes a traffic abnormality detecting unit that detects traffic abnormality information indicating an abnormality of traffic due to the packet with respect to the communication device. The performance measuring device includes a performance abnormality detecting unit that detects performance abnormality information indicating an abnormality of throughput of the communication device. The attack determining device includes an effects determining unit that determines whether the communication device received the denial-of-service attack, based on the traffic abnormality information and the performance abnormality information.

According to the present invention, the monitoring device detects the traffic abnormality information indicating the abnormality of traffic due to the packets sent to the communication device, the performance measuring device detects the performance abnormality information indicating the abnormality of a throughput of the communication device, and the attack determining device determines whether each of the abnormalities indicates the denial-of-service attack, based on the traffic abnormality information and the performance abnormality information. Therefore, by using not only the traffic abnormality information but also the performance abnormality information, that is, by using a relationship between these two, it is determined whether each of the abnormalities indicates the denial-of-service attack, which enables to improve the detection precision of denial-of-service attacks. Thus, it is possible to detect only a denial-of-service attack which needs to be dealt with.

With the denial-of-service attack detecting system according to the present invention, the monitoring device further includes a traffic-abnormality-information transmitting unit that transmits the traffic abnormality information to the attack determining device.

According to the present invention, the monitoring device transmits the traffic abnormality information to the attack determining device. Therefore, the attack determining device efficiently acquires the traffic abnormality information without accessing the monitoring device to refer to the traffic abnormality information, which enables to improve the detection precision of denial-of-service attacks. Thus, it is possible to detect only a denial-of-service attack which needs to be dealt with.

With the denial-of-service attack detecting system according to the present invention, the performance measuring device further includes a performance-abnormality-information transmitting unit that transmits the performance abnormality information to the attack determining device.

According to the present invention, the performance measuring device transmits the performance abnormality information to the attack determining device. Therefore, the attack determining device efficiently acquires the performance abnormality information without accessing the performance measuring device to refer to the performance abnormality information, which enables to improve the detection precision of denial-of-service attacks. Thus, it is possible to detect only a denial-of-service attack which needs to be dealt with.

With the denial-of-service attack detecting system according to the present invention, the traffic abnormality detecting unit detects the traffic abnormality information based on a predetermined attack detection condition that is set in advance.

According to the present invention, the traffic abnormality information is detected based on the predetermined attack detection condition which is preset. Therefore, the monitoring device can efficiently detect the traffic abnormality information and easily deal with a new attack, of which attack pattern is different from other attacks, by changing the attack detection condition.

With the denial-of-service attack detecting system according to the present invention, the traffic abnormality detecting unit generates a signature indicating a feature of the packet attacking the communication device, based on the attack detection condition, and generates the traffic abnormality information including the signature.

According to the present invention, the signature indicating the feature of each packet, which attacks the communication device, is generated based on the attack detection condition, and the traffic abnormality information including the signature is generated. Therefore, by generating the traffic abnormality information that reflects the features of the packets which attack, the reliability of the traffic abnormality information can be improved.

With the denial-of-service attack detecting system according to the present invention, the traffic abnormality detecting unit detects the traffic abnormality information based on a steady traffic indicating an average traffic of the packet transmitted to the communication device.

According to the present invention, the traffic abnormality information is detected based on the steady traffic indicating the average traffic of the packets sent to the communication device. Therefore, the traffic abnormality information can be easily generated based on how the traffic detected deviates from the steady traffic.

With the denial-of-service attack detecting system according to the present invention, the performance abnormality detecting unit detects the performance abnormality information based on a predetermined performance abnormality detection condition that is set in advance.

According to the present invention, the performance abnormality information is detected based on the predetermined performance abnormality detection condition which is preset. Therefore, the performance measuring device can efficiently detect the performance abnormality information, and easily deal with a difference between performances of communication devices as targets to be detected and deal with a change of the performances, by changing the performance abnormality detection condition.

Furthermore, according to the present invention, the performance abnormality detection condition includes the response time from transmission of a response request message to the communication device to reception of a response message to the response request message, and the number of times in which the response time exceeds the predetermined threshold. Therefore, the performance abnormality information can be easily generated based on the response time of the communication device.

With the denial-of-service attack detecting system according to the present invention, the performance abnormality detection condition includes a response time from transmission of a response request message to the communication device to reception of a response message corresponding to the response request message; and number of times that the response time exceeds a predetermined threshold.

According to the present invention, the performance abnormality detection condition includes the response time from transmission of a response request message to the communication device to reception of a response message to the response request message, and the number of times in which the response time exceeds the predetermined threshold. Therefore, the performance abnormality information can be easily generated based on the response time of the communication device.

With the denial-of-service attack detecting system according to the present invention, the performance abnormality detecting unit detects the performance abnormality information based on a steady performance indicating an average performance feature of the communication device.

According to the present invention, the performance abnormality information is detected based on the steady performance indicating the average performance feature of the communication device. Therefore, the performance abnormality information can be easily generated based on how the performance detected deviates from the steady performance.

With the denial-of-service attack detecting system according to the present invention, the effects determining unit determines that the communication device received the denial-of-service attack, when it is determined that one of the traffic abnormality information and the performance abnormality information causes an occurrence of other of the traffic abnormality information and the performance abnormality information based on an abnormality occurrence time included in the traffic abnormality information and the performance abnormality information.

According to the present invention, when it is determined that either one abnormality information between the traffic abnormality information and the performance abnormality information causes occurrence of the other abnormality information, based on each time, at which each of the abnormalities has occurred, included in the traffic abnormality information and the performance abnormality information, this is determined as the denial-of-service attack. Therefore, by using not only the traffic abnormality information but also the performance abnormality information, that is, by using a relationship between these two, it is determined whether the abnormality indicates the denial-of-service attack, which enables to improve the detection precision of denial-of-service attacks. Thus, it is possible to detect only a denial-of-service attack which needs to be dealt with.

With the denial-of-service attack detecting system according to the present invention, when the effects determining unit determines that the communication device received the denial-of-service attack, the attack determining device transmits the traffic abnormality information and the performance abnormality information used for the determination to a device for reporting to an operator.

According to the present invention, when the attack determining device determines that the abnormality indicates the denial-of-service attack, the attack determining device transmits the traffic abnormality information and the performance abnormality information used for the determination, to the device for reporting to the operator. Therefore, the operator can adequately deal with the abnormality based on these pieces of abnormality information.

With the denial-of-service attack detecting system according to the present invention, the effects determining unit determines whether the communication device received the denial-of-service attack, after performing an authorization based on certificates included in the traffic abnormality information and the performance abnormality information.

According to the present invention, authorization is performed based on the certificate included in the traffic abnormality information and the certificate included in the performance abnormality information, and then it is determined whether the abnormality is the denial-of-service attack. Therefore, spoofing by any unauthorized device can be effectively prevented.

A denial-of-service-attack detecting method according to another aspect of the present invention is for detecting a denial-of-service attack on a communication device by using a monitoring device that monitors a packet transmitted to a communication device that is a target of the denial-of-service attack, a performance measuring device that measures performance of the communication device, and an attack determining device that performs communication with the monitoring device and the performance measuring device. The denial-of-service-attack detecting method includes traffic abnormality detecting including the monitoring device detecting traffic abnormality information indicating an abnormality of traffic due to the packet with respect to the communication device; performance abnormality information detecting including the performance measuring device detecting performance abnormality information indicating an abnormality of throughput of the communication device; and effects determining including the attack determining device determining whether the communication device received the denial-of-service attack, based on the traffic abnormality information and the performance abnormality information.

According to the present invention, the monitoring device detects the traffic abnormality information indicating the abnormality of traffic due to the packets sent to the communication device, the performance measuring device detects the performance abnormality information indicating the abnormality of a throughput of the communication device, and the attack determining device determines whether each of the abnormalities indicates the denial-of-service attack, based on the traffic abnormality information and the performance abnormality information. Therefore, by using not only the traffic abnormality information but also the performance abnormality information, that is, by using a relationship between these two, it is determined whether each of the abnormalities indicates the denial-of-service attack, which enables to improve the detection precision of denial-of-service attacks. Thus, it is possible to detect only a denial-of-service attack which needs to be dealt with.

The denial-of-service-attack detecting method according to the present invention further includes traffic abnormality information transmitting including the monitoring device transmitting the traffic abnormality information to the attack determining device.

According to the present invention, the monitoring device transmits the traffic abnormality information to the attack determining device. Therefore, the attack determining device efficiently acquires the traffic abnormality information without accessing the monitoring device to refer to the traffic abnormality information, which enables to improve the detection precision of denial-of-service attacks. Thus, it is possible to detect only a denial-of-service attack which needs to be dealt with.

The denial-of-service-attack detecting method according to the present invention further includes performance abnormality information transmitting including the performance measuring device transmitting the performance abnormality information to the attack determining device.

According to the present invention, the performance measuring device transmits the performance abnormality information to the attack determining device. Therefore, the attack determining device efficiently acquires the performance abnormality information without accessing the performance measuring device to refer to the performance abnormality information, which enables to improve the detection precision of denial-of-service attacks. Thus, it is possible to detect only a denial-of-service attack which needs to be dealt with.

EFFECT OF THE INVENTION

According to the present invention, the monitoring device detects the traffic abnormality information indicating the abnormality of traffic due to the packets sent to the communication device, the performance measuring device detects the performance abnormality information indicating the abnormality of a throughput of the communication device, and the attack determining device determines whether each of the abnormalities indicates the denial-of-service attack, based on the traffic abnormality information and the performance abnormality information. Therefore, by using not only the traffic abnormality information but also the performance abnormality information, that is, by using a relationship between these two, it is determined whether each of the abnormalities indicates the denial-of-service attack, which enables to improve the detection precision of denial-of-service attacks. Thus, it is possible to detect only a denial-of-service attack which needs to be dealt with.

Furthermore, according to the present invention, the monitoring device transmits the traffic abnormality information to the attack determining device. Therefore, the attack determining device efficiently acquires the traffic abnormality information without accessing the monitoring device to refer to the traffic abnormality information, which enables to improve the detection precision of denial-of-service attacks. Thus, it is possible to detect only a denial-of-service attack which needs to be dealt with.

Moreover, according to the present invention, the performance measuring device transmits the performance abnormality information to the attack determining device. Therefore, the attack determining device efficiently acquires the performance abnormality information without accessing the performance measuring device to refer to the performance abnormality information, which enables to improve the detection precision of denial-of-service attacks. Thus, it is possible to detect only a denial-of-service attack which needs to be dealt with.

Furthermore, according to the present invention, the traffic abnormality information is detected based on the predetermined attack detection condition which is preset. Therefore, the monitoring device can efficiently detect the traffic abnormality information and easily deal with a new attack, of which attack pattern is different from other attacks, by changing the attack detection condition.

Moreover, according to the present invention, the signature indicating the feature of each packet, which attacks the communication device, is generated based on the attack detection condition, and the traffic abnormality information including the signature is generated. Therefore, by generating the traffic abnormality information that reflects the features of the packets which attack, the reliability of the traffic abnormality information can be improved.

Furthermore, according to the present invention, the traffic abnormality information is detected based on the steady traffic indicating the average traffic of the packets sent to the communication device. Therefore, the traffic abnormality information can be easily generated based on how the traffic detected deviates from the steady traffic.

Moreover, according to the present invention, the performance abnormality information is detected based on the predetermined performance abnormality detection condition which is preset. Therefore, the performance measuring device can efficiently detect the performance abnormality information, and easily deal with a difference between performances of communication devices as targets to be detected and deal with a change of the performances, by changing the performance abnormality detection condition.

Furthermore, according to the present invention, the performance abnormality detection condition includes the response time from transmission of a response request message to the communication device to reception of a response message to the response request message, and the number of times in which the response time exceeds the predetermined threshold. Therefore, the performance abnormality information can be easily generated based on the response time of the communication device.

Moreover, according to the present invention, the performance abnormality information is detected based on the steady performance indicating the average performance feature of the communication device. Therefore, the performance abnormality information can be easily generated based on how the performance detected deviates from the steady performance.

Furthermore, according to the present invention, when it is determined that either one abnormality information between the traffic abnormality information and the performance abnormality information causes occurrence of the other abnormality information, based on each time, at which each of the abnormalities has occurred, included in the traffic abnormality information and the performance abnormality information, this is determined as the denial-of-service attack. Therefore, by using not only the traffic abnormality information but also the performance abnormality information, that is, by using a relationship between these two, it is determined whether the abnormality indicates the denial-of-service attack, which enables to improve the detection precision of denial-of-service attacks. Thus, it is possible to detect only a denial-of-service attack which needs to be dealt with.

Moreover, according to the present invention, when the attack determining device determines that the abnormality indicates the denial-of-service attack, the attack determining device transmits the traffic abnormality information and the performance abnormality information used for the determination, to the device for reporting to the operator. Therefore, the operator can adequately deal with the abnormality based on these pieces of abnormality information.

Furthermore, according to the present invention, authorization is performed based on the certificate included in the traffic abnormality information and the certificate included in the performance abnormality information, and then it is determined whether the abnormality is the denial-of-service attack. Therefore, spoofing by any unauthorized device can be effectively prevented.

BRIEF DESCRIPTION OF DRAWINGS

FIG. 3 is a diagram of one example of attack detection conditions;

EXPLANATIONS OF LETTERS OR NUMERALS

Figure 1:
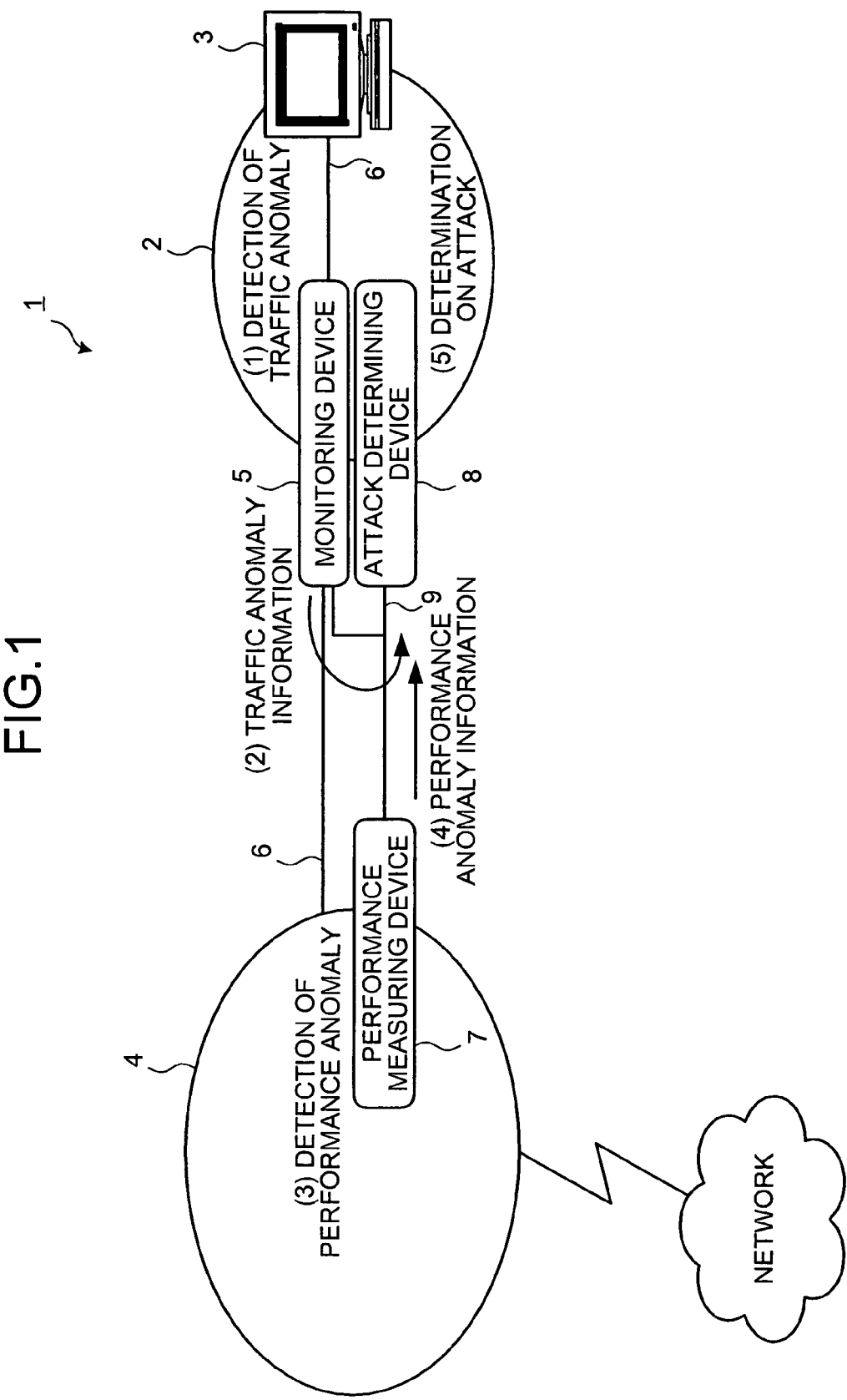
FIG. 1 is a block diagram of the configuration of a denial-of-service attack detecting system according to an embodiment of the present invention.

1 Denial-of-service attack detecting system
2 LAN
3 Communication device
4 WAN
5 Monitoring device
6, 9 Communication line
7 Performance measuring device
8 Attack determining device
10 Traffic abnormality detector
11 Traffic abnormality information transmitter
12 Signature generator
13, 14, 18, 19, 22 Communication interface
15 Switch
16 Performance abnormality detector
17 Performance abnormality information transmitter
20 Effects determining unit
21 Alert transmitter

BEST MODE(S) FOR CARRYING OUT THE INVENTION

Exemplary embodiments of a method and a system for detecting a denial-of-service attack according to the present invention will be explained in detail below with reference to the accompanying drawings.

Embodiments

FIG. 1 is a block diagram of the configuration of a denial-of-service attack detecting system 1 according to an embodiment of the present invention. The denial-of-service attack detecting system 1 shown in FIG. 1 is a system that detects a denial-of-service attack on a communication device 3 using a monitoring device 5, a performance measuring device 7, and an attack determining device 8. More specifically, if the monitoring device 5 on a local area network (LAN) 2 detects a traffic abnormality caused by packets sent to the communication device 3 (step (1) of FIG. 1), the monitoring device 5 transmits traffic abnormality information indicating the content of the traffic abnormality to the attack determining device 8 (step (2) of FIG. 1).

If the performance measuring device 7 on a wide area network (WAN) 4 detects a performance abnormality of the communication device 3 (step (3) of FIG. 1), the performance measuring device 7 transmits performance abnormality information indicating the content of the performance abnormality to the attack determining device 8 (step (4) of FIG. 1). When receiving the traffic abnormality information and the performance abnormality information, the attack determining device 8 on the LAN 2 determines whether each of the abnormalities indicates the denial-of-service attack on the communication device 3 based on these pieces of abnormality information (step (5) of FIG. 1).

Conventionally, when a denial-of-service attack on the communication device 3 as a target of an attack is detected, a system detects a denial-of-service attack in such a manner that the system previously calculates steady traffic by measuring traffic to the communication device 3, being a target of an attack, over a predetermined period of time, and determines such a case that the traffic monitored deviates from the steady traffic, as an attack. However, even if an abnormality seems to occur in traffic, there are many cases where no real damage is done to services provided by the communication device 3, because of a relationship between the scale of a denial-of-service attack and each throughput of the network and the communication device. Therefore, even if the abnormality is detected as a denial-of-service attack, there is often no need to actually deal with the abnormality. Thus, it looks as if there is no difference between this case and incorrect detection.

According to the present embodiment, the monitoring device 5 detects a traffic abnormality, and the performance measuring device 7 detects a performance abnormality of the communication device 3. Furthermore, the attack determining device 8 determines whether the abnormality indicates an attack, based on the traffic abnormality and the performance abnormality. Therefore, according to the present embodiment, the determination on an attack can be performed based on not only the traffic abnormality but also the performance abnormality of the communication device 3, which enables to improve the detection precision of denial-of-service attacks, thus, efficiently detecting only a denial-of-service attack which needs to be dealt with.

It is noted that FIG. 1 shows the case where the monitoring device 5 and the attack determining device 8 are connected to the same LAN 2 to which the communication device 3 is connected and the performance measuring device 7 is connected to the WAN 4, but there is no limitation in the lines to which the devices (the monitoring device 5, the performance measuring device 7, and the attack determining device 8) are connected respectively.

The system configuration of the denial-of-service attack detecting system 1 is explained below. As shown in FIG. 1, the denial-of-service attack detecting system 1 includes the monitoring device 5 that is provided on the LAN 2 in a small-and-medium company and monitors packets transmitted to at least one communication device 3 which is connected to the LAN 2, through the WAN 4 such as a backbone network; the performance measuring device 7 that is provided on the WAN 4 and measures performance of the communication device 3 through the WAN 4; and the attack determining device 8 that is provided on the LAN 2 and is connected to the monitoring device 5 and the performance measuring device 7 through a communication line 9. However, the configuration of the denial-of-service attack detecting system 1 shown in FIG. 1 is only one example, and the denial-of-service attack detecting system according to the present invention may also include a plurality of performance measuring devices 7, or may be configured to use Web (World Wide Web) site performance measurement services provided by some other party, instead of part of or the whole of the performance measuring devices 6.

The monitoring device 5 is formed with a router that constitutes the LAN 2. The monitoring device 5 may also be formed with a firewall, etc. provided on the LAN 2.

Figure 2:
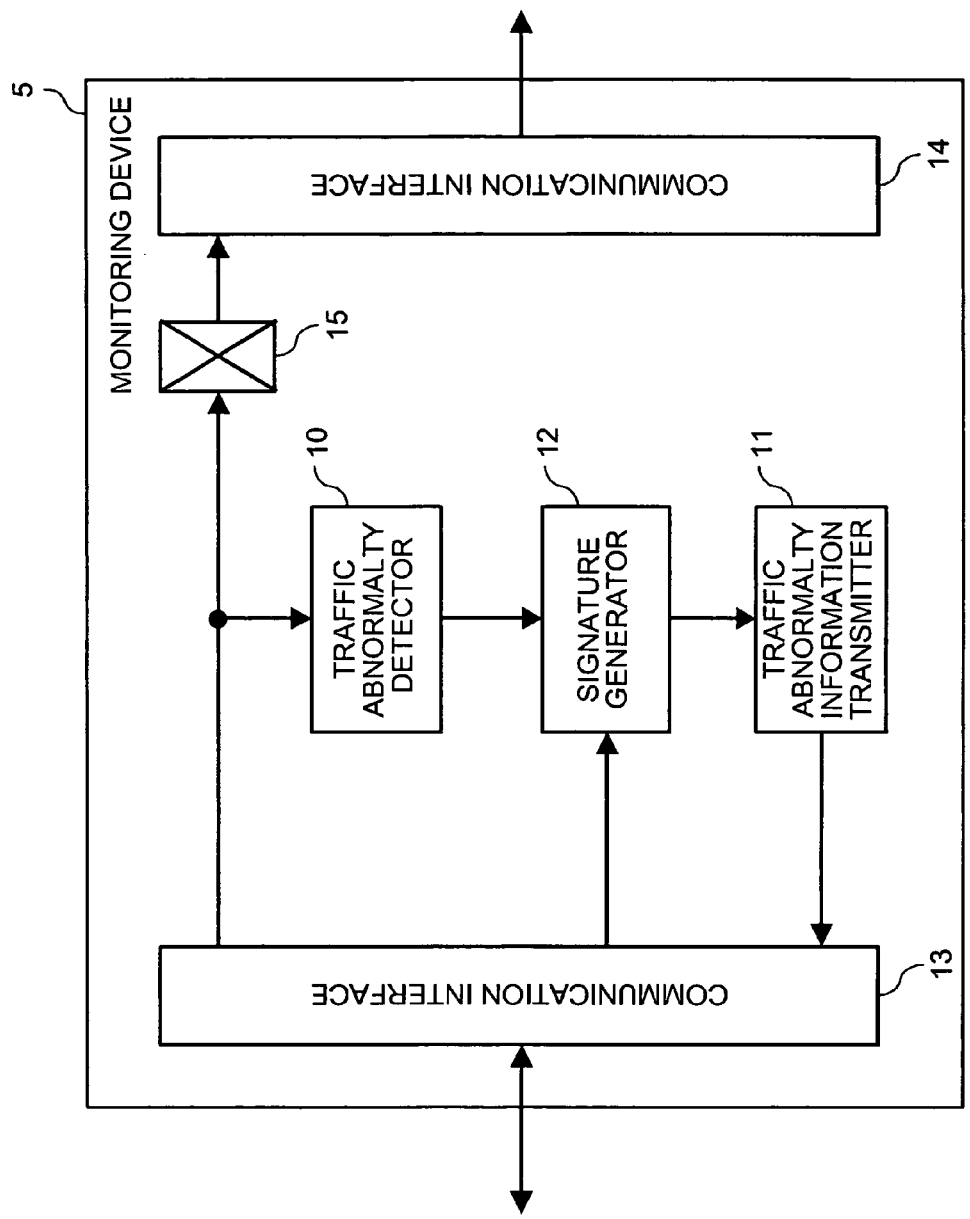
FIG. 2 is a block diagram of the configuration of a monitoring device shown in FIG. 1.

FIG. 2 is a block diagram of the configuration of the monitoring device 5 shown in FIG. 1. The monitoring device 5 includes a traffic abnormality detector 10 that detects a traffic abnormality due to packets transmitted to the communication device 3; a traffic abnormality information transmitter 11 that transmits information for the traffic abnormality detected to the attack determining device 8; a signature generator 12 that generates a signature indicating a feature of a packet which attacks the communication device 3; communication interfaces 13 and 14 for performing communication with each of the devices, including the attack determining device 8, provided on the WAN 4 and the LAN 2, respectively; and a switch 15 for routing a packet.

The traffic abnormality detector 10 is a processor that detects an attack based on preset attack detection conditions. FIG. 3 is a diagram of one example of attack detection conditions. In FIG. 3, the attack detection conditions include two sets of records, a set of detection attributes and a set of a detection threshold and a detection time. The detection attribute indicates an attribute of a packet as a target for detection, the detection threshold indicates a threshold of a transmission rate of a packet as a target for detection, and the detection time indicates a threshold of a time during which the transmission rate of a packet as a target for detection exceeds the detection threshold.

For example, a first detection condition is applied to a packet as a target for detection, in which destination address information is 192.168.1.1 (Dst=192.168.1.1/32), a protocol of a transport layer is a transmission control protocol (TCP) (Protocol=TCP), and a TCP port number is 80 (Port=80). If a state such that the transmission rate of the packets as targets for detection exceeds 300 kbps continues 10 seconds or more, this state is detected as a traffic abnormality due to the packets as targets for detection.

Likewise, a second detection condition is applied to a packet as a target for detection, in which destination address information is 192.168.1.2 (Dst=192.168.1.2/32). If a state such that the transmission rate of the packets as targets for detection exceeds 100 kbps continues 10 seconds or more, this state is detected as a traffic abnormality due to the packets as targets for detection.

When the traffic abnormality detector 10 detects the attack by the packets as targets for detection in the above manner, the signature generator 12 generates a signature indicating the feature of each packet as a target for detection. For example, if the attack that matches the first detection condition of the attack detection conditions of FIG. 3 is detected, then the signature generator 12 generates a signature indicating a packet in which the destination address information is 192.168.1.1, the protocol of the transport layer is TCP, and the TCP port number is 80.

The method mentioned above is a method of previously setting conditions for making determination on the case as an attack. However, another method may also be used, the another method including measuring average traffic, previously storing the average traffic as steady traffic, and determining the case where traffic deviates from the steady traffic, as an attack.

The traffic abnormality information transmitter 11 is a processor that transmits traffic abnormality information, which includes the signature generated by the signature generator 12 and indicates that a traffic abnormality is detected, to the attack determining device 8. The traffic abnormality information transmitter 11 also transmits thereto a certificate, indicating that the own device is the authorized monitoring device 5, included in the traffic abnormality information. By including the certificate in the traffic abnormality information in this manner, spoofing by any unauthorized device can be prevented.

The traffic abnormality information transmitter 11 may also transmit the traffic abnormality information through a path different from a transmission line 6 through which packets are transmitted or received. According to the present embodiment, the traffic abnormality information is transmitted to the attack determining device 8, but the attack determining device 8 may also refer to the traffic abnormality information in the monitoring device 5.

The performance measuring device 7 shown in FIG. 1 is formed with a computer that executes a program of measuring a response time to an Internet site.

Figure 4:
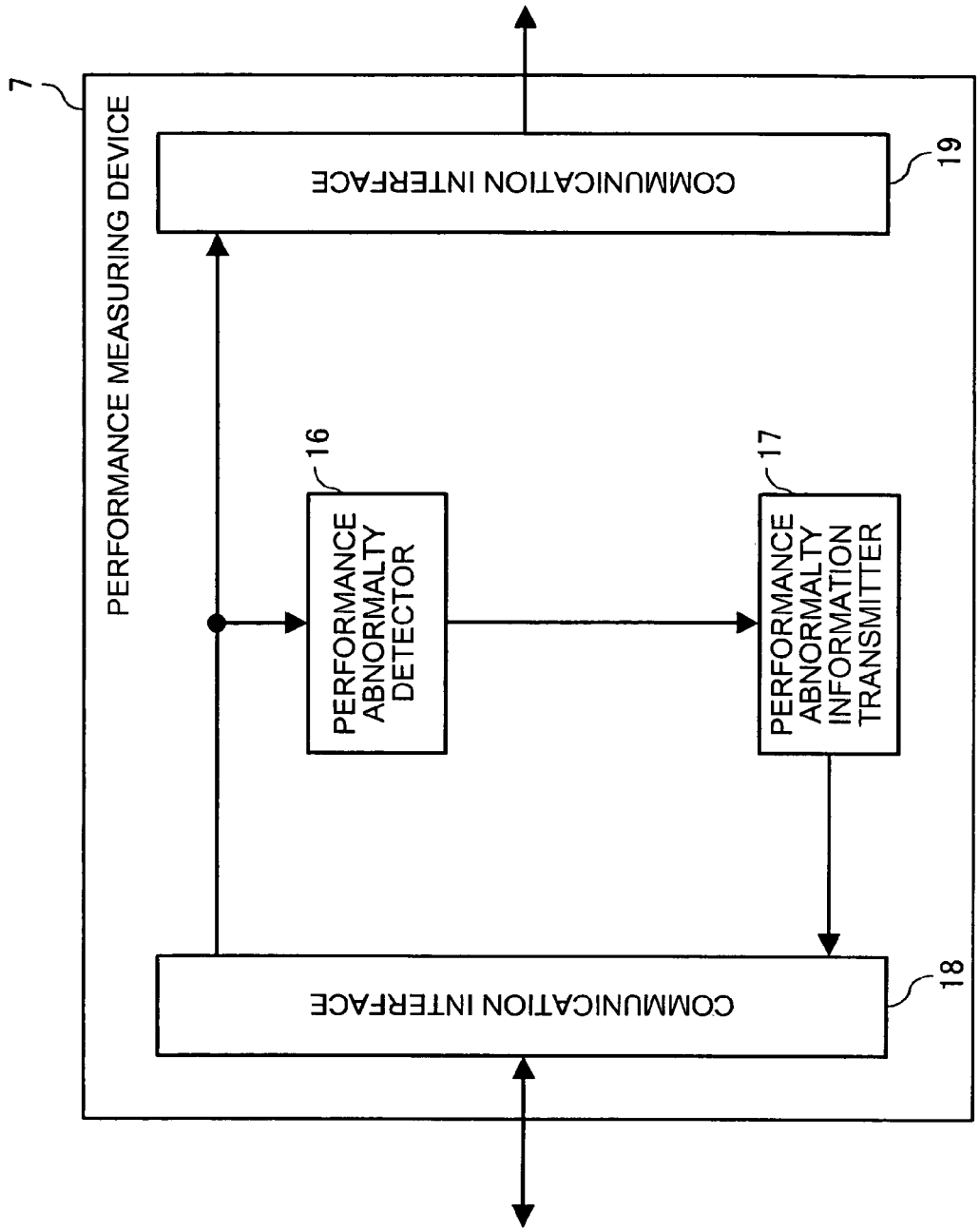
FIG. 4 is a block diagram of the configuration of a performance measuring device shown in FIG. 1.

FIG. 4 is a block diagram of the configuration of the performance measuring device 7 shown in FIG. 1. The performance measuring device 7 includes a performance abnormality detector 16 that detects a performance abnormality based on preset performance abnormality detection conditions; a performance abnormality information transmitter 17 that transmits information for the performance abnormality detected to the attack determining device 8; and communication interfaces 18 and 19 for performing communication with the attack determining device 8 and for performing communication with each device to measure its performance, respectively.

Figures 5, 6:
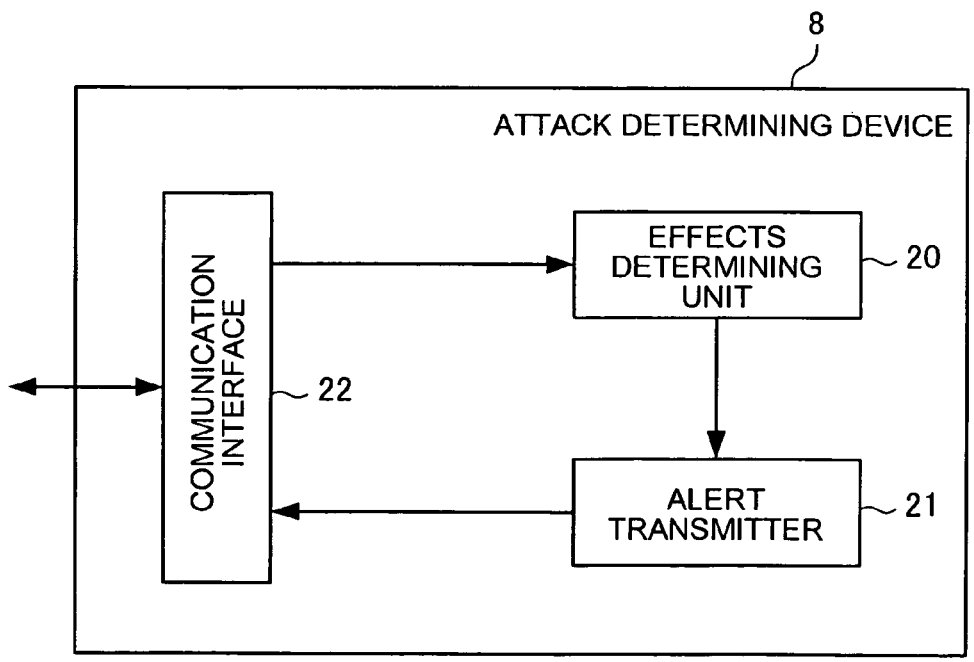
FIG. 5 is a diagram of one example of performance abnormality detection conditions.
FIG. 6 is a block diagram of the configuration of an attack determining device shown in FIG. 1.

FIG. 5 is a diagram of one example of performance abnormality detection conditions. In FIG. 5, the performance abnormality detection conditions include two sets of records, a set of performance attributes and a set of a detection threshold and the number of times of detection. The performance attribute indicates a procedure of measuring performance, the detection threshold indicates a threshold of the response time from the communication device 3, and the number of times of detection indicates times of measurement and times, in which the response time exceeds the threshold of the response time, of the times of measurement.

For example, a first performance abnormality detection condition is measurement of a response time from access to www.abc.com by a hypertext transfer protocol (HTTP) to returning of a character string of "hello". If there are two or more times, in which the response time is five seconds or more, out of three times of measurement, then this is detected as a performance abnormality of the communication device 3.

Likewise, a second performance abnormality detection condition is detection of a case, as a performance abnormality of the communication device 3, where there is even one response time which is five seconds or more, the response time being from access to www.def.com by HTTP: parameter "search?hl=ja&ie=UTF-8&q=x+Y&lr=" to returning of a character string of "search result".

When the performance abnormality detector 16 detects the performance abnormality of the communication device 3 in the above manner, the performance abnormality information transmitter 17 transmits performance abnormality information indicating detection of the performance abnormality, to the attack determining device 8. The performance abnormality information transmitter 17 also transmits thereto a certificate, indicating that the own device is the authorized performance measuring device 7, included in the performance abnormality information. By including the certificate in the performance abnormality information in this manner, spoofing by any unauthorized device can be prevented. According to the present embodiment, the performance abnormality information is transmitted to the attack determining device 8, but the attack determining device 8 may also refer to the performance abnormality information in the performance measuring device 7.

The method mentioned above is a method of previously setting conditions to detect the performance abnormality, but another method may also be used, the another method including measuring an average performance feature, previously storing it as steady performance, and detecting a performance abnormality when the performance deviates from the steady performance.

FIG. 6 is a block diagram of the configuration of the attack determining device 8 shown in FIG. 1. The attack determining device 8 includes an effects determining unit 20 that determines whether the abnormality of traffic detected causes the performance abnormality detected, based on the traffic abnormality information sent from the monitoring device 5 and the performance abnormality information sent from the performance measuring device 7; an alert transmitter 21 that reports the result of determination to an operator and the like; and a communication interface 22 for performing communication with each of the monitoring device 5, the performance measuring device 7, and the device for reporting to the operator.

For example, the host address of www.abc.com is 192.168.1.1. Assume that the attack determining device 8 receives, at time t, the traffic abnormality information indicating the abnormality of traffic in which the TCP port number for 192.168.1.1 is 80, and then, receives, at a point in time t+α, the performance abnormality information indicating that an abnormality occurs in the response time of the communication device 3 with www.abc.com. Under such situations, if both times when the abnormalities related to the traffic and performance abnormality information occur are close to each other (e.g., α is within 1 minute), the attack determining device 8 determines that there is a high probability that the traffic abnormality may cause response degradation of www.abc.com, reports this effect to the operator through the alert transmitter 21, and prompts the operator to deal with this case.

When the effects determining unit 20 determines, in the above manner, the case as the denial-of-service attack, the alert transmitter 21 transmits the traffic abnormality information and the performance abnormality information used for the determination to the device for reporting to the operator. According to the present embodiment, the traffic abnormality information and the performance abnormality information are transmitted to the device for reporting to the operator, but the attack determining device 8 may also be provided with a display unit, to report these pieces of abnormality information to the operator using the display unit.

The effects determining unit 20 may perform authorization based on the certificate included in the traffic abnormality information sent from the monitoring device 5 and the certificate included in the performance abnormality information sent from the performance measuring device 7, and then determine whether the case is the denial-of-service attack. This allows removal of the effects due to forged traffic abnormality information and performance abnormality information.

Figure 7:
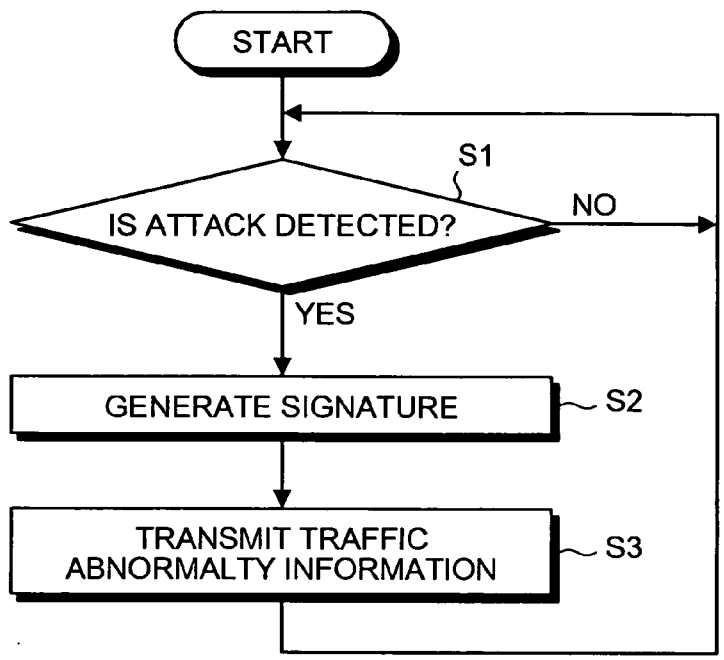
FIG. 7 is a flowchart of the operation of the monitoring device shown in FIG. 2.

The operations of the denial-of-service attack detecting system 1 configured in the above manner are explained below with reference to FIG. 7 through FIG. 9. FIG. 7 is a flowchart of the operation of the monitoring device 5 shown in FIG. 2.

When the traffic abnormality detector 10 detects an attack by packets transmitted to the communication device 3 based on the attack detection conditions (step S1), the signature generator 12 generates a signature indicating the feature of each of the packets by which attack is detected (step S2), and the traffic abnormality information transmitter 11 transmits traffic abnormality information including the signature generated to the attack determining device 8 (step S3).

Figure 8:
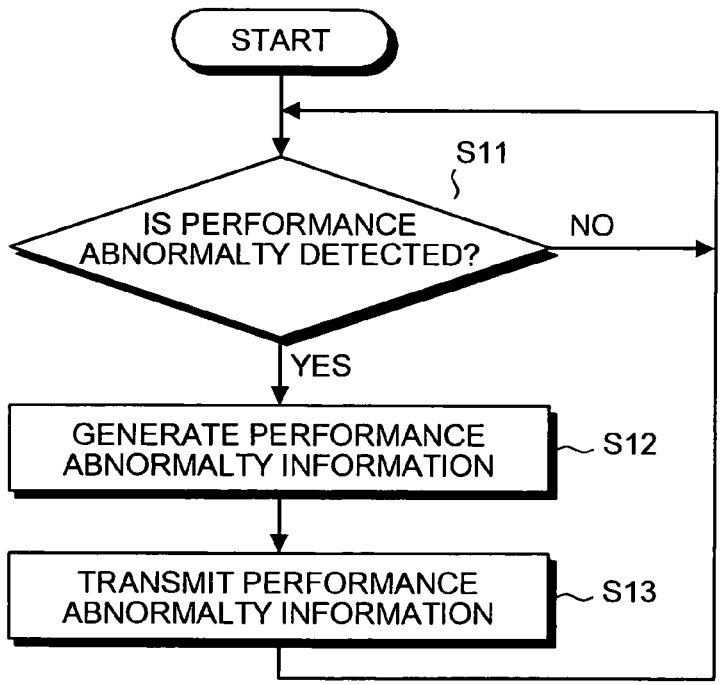
FIG. 8 is a flowchart of the operation of the performance measuring device shown in FIG. 4.

FIG. 8 is a flowchart of the operation of the performance measuring device 7 shown in FIG. 4. At first, when the performance abnormality detector 16 detects an abnormality of the response time of the communication device 3 based on the performance abnormality detection conditions (step S11), the performance abnormality detector 16 generates performance abnormality information including the information detected (step S12), and the performance abnormality information transmitter 17 transmits the performance abnormality information generated to the attack determining device 8 (step S13).

Figure 9:
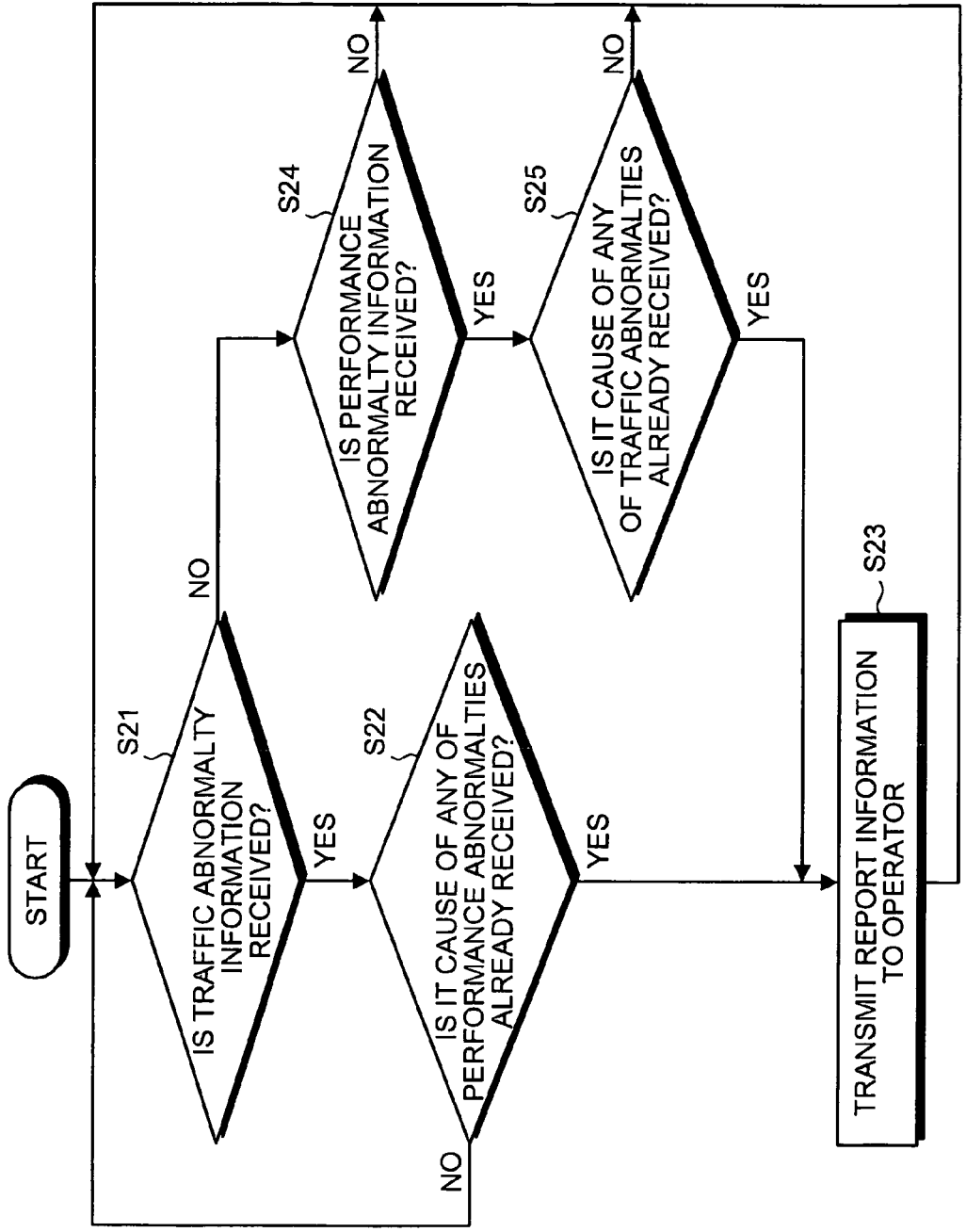
FIG. 9 is a flowchart of the operation of the attack determining device shown in FIG. 6.

FIG. 9 is a flowchart of the operation of the attack determining device 8 shown in FIG. 6. When the traffic abnormality information is received from the monitoring device 5 (step S21), the attack determining device 8 searches for any performance abnormality which the traffic abnormality information received may cause, from the pieces of performance abnormality information received until then (step S22). When it is found, the attack determining device 8 transmits the relevant traffic abnormality information and performance abnormality information to the device for reporting to the operator (step S23).

When the performance abnormality information is received from the performance measuring device 7 (step S24), the attack determining device 8 searches for any traffic abnormality which the performance abnormality information received may cause, from the pieces of traffic abnormality information received until then (step S25). When it is found, the attack determining device 8 transmits the relevant traffic abnormality information and performance abnormality information to the device for reporting to the operator (step S23).

As explained above, according to the denial-of-service attack detecting system 1, traffic abnormalities and performance abnormalities are detected, and it is determined whether there is a relationship between these abnormalities, to thereby enable detection of only a traffic abnormality which is the cause of a performance abnormality. Therefore, improved detection precision of denial-of-service attacks allows detection of only a denial-of-service attack which needs to be dealt with by the operator.

The monitoring device, the performance measuring device, and the attack determining device according to the present embodiment implement their functions by causing each computer to load a program and execute it. More specifically, a program including a routine, which detects a traffic abnormality of packets sent to a communication device, is stored in a read only memory (ROM) etc. of the computer in the monitoring device. A program including a routine, which detects a performance abnormality of a communication device, is stored in ROM etc. of the computer in the performance measuring device. A program including a routine, which determines a relationship between traffic abnormality information and performance abnormality information, is stored in ROM etc. of the computer in the attack determining device. Each of the devices loads relevant one of the programs into a central processing unit (CPU) and executes it, and it is thereby possible to form the monitoring device, the performance measuring device, and the attack determining device according to the present invention.

INDUSTRIAL APPLICABILITY

As explained above, the denial-of-service attack detecting system and the denial-of-service attack detecting method according to the present invention are suitable for detection of the denial-of-service attacks on communication devices.

The invention claimed is:

1. A denial-of-service attack detecting system for detecting a denial-of-service attack on a communication device, the denial-of-service attack detecting system comprising:

a monitoring device that monitors each packet transmitted to the communication device and includes a traffic abnormality detecting unit that detects traffic abnormality information indicating an abnormality of traffic based on packets transmitted to the communication device;

a performance measuring device that measures response performance of the communication device based on a performance abnormality detection condition including a response time from transmission of a response request message to the communication device, to reception of a response message corresponding to the response request message, the performance measuring device being separate from and connected with the communication device and the monitoring device through a network, the performance measuring device including a performance abnormality detecting unit that detects performance abnormality information indicating an abnormality of throughput of the communication device; and an attack determining device that is connected to and performs communication with the monitoring device and the performance measuring device, the attack determining device including an effects determining unit that determines whether the communication device has received the denial-of-service attack, using both the traffic abnormality information and the performance abnormality information, and the effects determining unit determining that the communication device has received the denial-of-service attack, when it is determined that one of the traffic abnormality information and the performance abnormality information causes an occurrence of one of the traffic abnormality information and the performance abnormality information based on an abnormality occurrence time included in the traffic abnormality information and the performance abnormality information.

2. The denial-of-service attack detecting system according to claim 1, wherein
the monitoring device further includes a traffic-abnormality-information transmitting unit that transmits the traffic abnormality information to the attack determining device.

3. The denial-of-service attack detecting system according to claim 1, wherein
the performance measuring device further includes a performance-abnormality-information transmitting unit that transmits the performance abnormality information to the attack determining device.

4. The denial-of-service attack detecting system according to claim 1, wherein
the traffic abnormality detecting unit detects the traffic abnormality information based on a predetermined attack detection condition that is set in advance.

5. The denial-of-service attack detecting system according to claim 4, wherein
the monitoring unit further includes a signature generating unit that generates a signature indicating a feature of a packet attacking the communication device, based on the attack detection condition, and
the traffic abnormality information includes the signature.

6. The denial-of-service attack detecting system according to claim 1, wherein
the traffic abnormality detecting unit detects the traffic abnormality information based on a steady traffic indicating an average traffic of packets transmitted to the communication device.

7. The denial-of-service attack detecting system according to claim 1, wherein
the performance abnormality detecting unit detects the performance abnormality information based on a predetermined performance abnormality detection condition that is set in advance.

8. The denial-of-service attack detecting system according to claim 7, wherein
the performance abnormality detection condition includes
a response time from transmission of the response request message to the communication device to reception of a response message corresponding to the response request message, and
number of times that the response time exceeds a predetermined threshold.

9. The denial-of-service attack detecting system according to claim 1, wherein
the performance abnormality detecting unit detects the performance abnormality information based on a steady response performance indicating an average response performance feature of the communication device.

10. The denial-of-service attack detecting system according to claim 1, wherein
when the effects determining unit determines that the communication device has received the denial-of-service attack, the attack determining device transmits the traffic abnormality information and the performance abnormality information used for the determination to a device for reporting to an operator.

11. The denial-of-service attack detecting system according to claim 1, wherein
each of the traffic abnormality information and the performance abnormality information includes a certificate, and
the effects determining unit determines whether the communication device received the denial-of-service attack, after performing an authorization based on certificates.

12. A method of detecting a denial-of-service attack on a communication device by using a monitoring device that monitors each packet transmitted to the communication device, a performance measuring device that measures response performance of the communication device based on a performance abnormality detection condition including a response time from transmission of a response request message to the communication device, to reception of a response message corresponding to the response request message, and an attack determining device that is connected to and performs communication with the monitoring device and the performance measuring device, the method comprising:
detecting a traffic abnormality using the monitoring device to detect traffic abnormality information indicating an abnormality of traffic based on packets transmitted to the communication device;
detecting performance abnormality information using the performance measuring device to detect performance abnormality information indicating an abnormality of throughput of the communication device, wherein the performance measuring device being separate from and connected with the communication device and the monitoring device through a network; and
determining effects using the attack determining device to determine whether the communication device has received the denial-of-service attack, using both the traffic abnormality information and the performance abnormality information, the determining including determining that the communication device has received the denial-of-service attack, when it is determined that one of the traffic abnormality information and the performance abnormality information causes an occurrence of one of the traffic abnormality information and the performance abnormality information based on an abnormality occurrence time included in the traffic abnormality information and the performance abnormality information.

13. The method according to claim 12, further comprising:
transmitting traffic abnormality information using the monitoring device to transmit the traffic abnormality information to the attack determining device.

14. The method according to claim 12, further comprising:
transmitting performance abnormality information using the performance measuring device to transmit the performance abnormality information to the attack determining device.

* * * * *